(12) United States Patent
Snelling

(10) Patent No.: US 9,712,389 B2
(45) Date of Patent: Jul. 18, 2017

(54) METHOD, APPARATUS, AND PROGRAM FOR THE DISCOVERY OF RESOURCES IN A COMPUTING ENVIRONMENT

(75) Inventor: David Snelling, Flackwell Heath (GB)

(73) Assignee: FUJITSU LIMITED, Kawasaki (JP)

( * ) Notice: Subject to any disclaimer, the term of this patent is extended or adjusted under 35 U.S.C. 154(b) by 145 days.

(21) Appl. No.: 13/137,980

(22) Filed: Sep. 22, 2011

(65) Prior Publication Data

US 2012/0110014 A1 May 3, 2012

(30) Foreign Application Priority Data

Oct. 28, 2010 (GB) .................................. 1018234.3

(51) Int. Cl.
*G06F 7/00* (2006.01)
*G06F 17/30* (2006.01)
*H04L 12/24* (2006.01)
*H04L 12/26* (2006.01)

(52) U.S. Cl.
CPC .......... *H04L 41/0893* (2013.01); *H04L 43/12* (2013.01)

(58) Field of Classification Search
CPC .......... G06F 30/241; G06F 30/89; G06F 9/50; G06F 9/46; G06F 17/30864; H04L 43/12; H04L 41/0893
USPC .......................................... 707/776, 999.006
See application file for complete search history.

(56) References Cited

U.S. PATENT DOCUMENTS

| 5,136,705 A * | 8/1992 | Stubbs ........... G01R 31/318307 714/27 |
| 6,075,938 A * | 6/2000 | Bugnion ................. G06F 9/544 703/27 |
| 6,314,435 B1 * | 11/2001 | Wollrath ............... G06F 9/4411 |
| 6,697,879 B1 * | 2/2004 | Tufty ..................... G06Q 10/00 700/65 |
| 7,216,326 B2 * | 5/2007 | Papanikolaou et al. ...... 716/120 |

(Continued)

FOREIGN PATENT DOCUMENTS

WO    WO 2011/108553 A1    9/2011

OTHER PUBLICATIONS

Yao et al., "Query Processing for Sensor Networks", CIDR conference 2003.*

(Continued)

*Primary Examiner* — Daniel Kuddus
(74) *Attorney, Agent, or Firm* — Staas & Halsey LLP

(57) ABSTRACT

Embodiments of the present invention provide a detector apparatus for detecting a physical resource employed in providing a particular virtual resource in a computer network, the computer network including a plurality of physical resources each being operable to be employed in providing virtual resources and having an environment sensor outputting sensor data representing changes in an operating property of the physical resource. A detector apparatus embodying the present invention comprises a sensor data receptor operable to receive sensor data output by the environment sensors, a pattern extractor operable to extract a pattern from the received sensor data from a physical resource, and a pattern matcher, wherein the pattern matcher is operable to compare the extracted pattern with a unique pattern known to be generated by a particular virtual resource, and to detect that the physical resource is employed in providing the particular virtual resource when a match is found.

15 Claims, 4 Drawing Sheets

(56) References Cited

U.S. PATENT DOCUMENTS

| | | | |
|---|---|---|---|
| 7,322,047 B2* | 1/2008 | Redlich et al. | 726/27 |
| 7,649,909 B1* | 1/2010 | Archard | H04L 12/4633 370/477 |
| 7,796,155 B1* | 9/2010 | Neely et al. | 348/157 |
| 7,886,021 B2* | 2/2011 | Scheifler | G06F 9/485 709/217 |
| 8,019,252 B2* | 9/2011 | Funada | G03G 21/1846 399/107 |
| 8,019,352 B2* | 9/2011 | Rappaport | G01S 5/0252 340/988 |
| 8,103,764 B2* | 1/2012 | Aviles | 709/224 |
| 8,159,985 B2* | 4/2012 | Karaoguz et al. | 370/312 |
| 8,417,658 B2* | 4/2013 | Arnold et al. | 706/48 |
| 8,560,134 B1* | 10/2013 | Lee | H02J 13/0086 700/28 |
| 2003/0182435 A1* | 9/2003 | Redlich et al. | 709/229 |
| 2004/0107245 A1* | 6/2004 | Bodnar | G06F 17/30905 709/203 |
| 2005/0091343 A1* | 4/2005 | Murray, Jr. | H04N 1/00222 709/219 |
| 2005/0131900 A1* | 6/2005 | Palliyll | H04L 67/2819 |
| 2006/0031509 A1* | 2/2006 | Ballette | G06F 9/5072 709/226 |
| 2007/0250930 A1* | 10/2007 | Aziz | G06F 21/554 726/24 |
| 2008/0025614 A1* | 1/2008 | Hintz et al. | 382/189 |
| 2008/0209005 A1 | 8/2008 | Akamatsu et al. | |
| 2009/0037585 A1* | 2/2009 | Miloushev | G06F 9/5016 709/226 |
| 2009/0099852 A1* | 4/2009 | Ouimet | G06Q 30/0281 705/346 |
| 2009/0099862 A1* | 4/2009 | Fireman | G06F 19/3418 705/2 |
| 2009/0217103 A1 | 8/2009 | Borelli et al. | |
| 2009/0249333 A1 | 10/2009 | Yamaguchi et al. | |
| 2010/0138682 A1* | 6/2010 | Obana | G06F 1/206 713/340 |
| 2010/0195600 A1* | 8/2010 | Gorokhov et al. | 370/329 |
| 2010/0274573 A1* | 10/2010 | Feied et al. | 705/2 |
| 2011/0072052 A1* | 3/2011 | Skarin et al. | 707/794 |
| 2012/0278045 A1* | 11/2012 | Saigo et al. | 703/1 |
| 2012/0331553 A1* | 12/2012 | Aziz | G06F 21/554 726/23 |
| 2013/0042000 A1 | 2/2013 | Machida | |

OTHER PUBLICATIONS

Office Action mailed Mar. 17, 2015 for corresponding Japanese Patent Application No. 2011-209635.

* cited by examiner

METHOD, APPARATUS, AND PROGRAM FOR THE DISCOVERY OF RESOURCES IN A COMPUTING ENVIRONMENT

CROSS REFERENCE TO RELATED APPLICATIONS

This application claims priority from United Kingdom Patent Application No. 1018234.3 filed on Oct. 28, 2010 in the United Kingdom Intellectual Property Office, the entire disclosures of which are incorporated herein by reference.

BACKGROUND OF THE INVENTION

This invention is in the field of computing, and in particular is directed to the management and control of computing environments, such as a computer network. Specifically, the invention relates to the discovery of which physical resources are employed in providing a particular virtual resource.

One of the major issues facing the IT industry is resource discovery. A large and increasing number of IT resources are associated with the delivery of even the simplest service. Identifying these resources and associating them with a particular service is a significant challenge. The re-emergence of centralized IT provisioning (e.g. outsourcing and Cloud Computing) has increased the number of resources collocated at a single site. With the addition of virtualization, whilst many aspects of management become easier, the discovery problem, that is, identifying the physical resources involved in providing a particular service or virtual resource, becomes greater.

Virtual resources, servers in particular, unlike their physical counterparts, have the ability to move. Virtual machine migration involves a multiple stage process. The virtual server is stopped, copied out of the physical memory of its physical host, and copied to another physical host and restarted. In the process, management tools may lose track of which physical server has gained or lost a given virtual server. IT management tools are designed to address this issue, but nonetheless the problem persists. A virtual server can be hosted on any physical server and even change the server on which it is hosted. Identifying where a virtual resource is hosted is critical to the resource management. For example, if a given service (e.g. an online purchasing system) is running slowly, it is important to identify which physical servers are involved in the service. However, this can be challenging.

This problem is amplified in a Cloud Computing environment, where the layers between IaaS, PaaS, and SaaS mean that management tools at one layer are not given access to provisioning details at the lower layers. In a Cloud Computing environment, a Software as a Service (SaaS) is built on a Platform as a Service (PaaS), which runs on an Infrastructure as a Service (IaaS). These layers are isolated from each other, creating further barriers to the discovery process. A resource, physical or virtual, normally has some form of identifier that provides it with a unique identity. These are usually assigned at provisioning time. Typically resources can advertise their existence by broadcasting this identifier across the network.

Software management tools can easily collect this identity information along with other information by monitoring the network protocol traffic. While the location of a physical resource can be determined by cross-referencing this identity information with an asset register, the same is not true of virtual resources. As they can be created dynamically (virtual resources can easily be duplicated and started in an already existing host) or moved from host to host (as described above), determining their location is currently not possible or at best unreliable and error prone.

SUMMARY OF THE INVENTION

An embodiment of the present invention provides a detector apparatus for detecting a physical resource employed in providing a particular virtual resource in a computing environment, the computing environment including a plurality of physical resources each being operable to be employed in providing virtual resources and having an environment sensor outputting sensor data representing changes in an operating property of the physical resource. The detector apparatus comprises a sensor data receptor operable to receive sensor data output by the environment sensors, a pattern extractor operable to extract a pattern from the received sensor data from a physical resource, and a pattern matcher. The pattern matcher is operable to compare the extracted pattern with an identifier pattern known to be generated by a particular virtual resource, and to detect that the physical resource is employed in providing the particular virtual resource when a match is found.

Advantageously, such an embodiment provides a way in which virtual resources can be discovered in a computing environment. The location and identity of a physical resource is known and effectively fixed, so the detection of a physical resource employed in providing a particular virtual resource enables the virtual resource to be effectively located within the environment. Performance problems linked to the virtual resource can then be associated to a physical resource or group of physical resources, which may facilitate remedying the problem.

The only knowledge required for the discovery is the identifier pattern generated by a particular virtual resource. Virtual resources do not need to be tracked, and discovery of a current location in the environment is not dependent on knowledge of previous locations.

The computing environment may be a computer network, a cloud computing environment, a computing device having multiple physical resources, or some domain or sub-domain of a wider network or environment.

The operating property may be a property relating to power, such as the voltage or current drawn by a particular component of the physical resource, for example, the processor (CPU). Alternatively, the operating property may be power, found by sensing both voltage and current drawn by a particular component and calculating the product. In an alternative embodiment, the operating property may be temperature of a particular location on the physical resource, preferably a location whose temperature changes sharply in response to behaviour of the physical resource. The operating property can be any property whose value is correlated to behaviour of the physical resource.

The identifier pattern generated by the particular virtual resource may become known to the detector apparatus by being input by a user or other service or apparatus. Optionally, the detector apparatus may further comprise a memory storing a list of virtual resources and, for each, the identifier pattern it is known to generate. It may be that the identifier patterns are stored explicitly. Alternatively, it may be that the identifier pattern can be derived directly from an identifier of the virtual resource, for example, as a binary bit pattern of a unique ID number. Therefore, the patterns can be stored implicitly by storing the unique ID number or other identification of the virtual resources, and instructions for deriving the respective identifier patterns therefrom. The pattern matcher may be operable to select as the particular virtual resource a virtual resource from the list stored in the memory.

Advantageously, storing a list simplifies the amount of information a user or external service needs to give the detector apparatus to achieve a detection. The identifier pattern does not need to be known by the user or external service, merely some way of distinguishing the particular virtual resource from other virtual resources.

A further advantage is realised in a situation where, for example, a user or external service attempts to detect which virtual resources a particular physical resource is employed in providing. In this case, a pattern extracted by the pattern extractor can be compared with identifier patterns from the list by the pattern matcher in an iterative fashion looking for matches.

Furthermore, storing a list of known patterns can reduce the accuracy of match required between the extracted pattern and the identifier pattern of the particular virtual resource. For example, if during comparison the pattern matcher does not consider an extracted pattern to be an exact match to the identifier pattern of a particular virtual resource (for example if some bits of the pattern are unresolvable), but a match is not excluded by the comparison, and matches with other known patterns from the list are excluded, then the pattern matcher may be configured to assume that a match is found.

The detector apparatus may provide an interface by which a user or external service can access the functionality it provides. For example, embodiments of the present invention may further comprise a query receptor operable to receive a query identifying a virtual resource and requesting detection of a physical resource employed in providing that virtual resource, and a response generator operable, when a match is found by the pattern matcher using the virtual resource identified in the query as the particular virtual resource, to generate and output a response identifying that the physical resource is employed in providing the virtual resource identified in the query.

Advantageously, the query receptor and response generator provide an interface for users and services to access the detector apparatus functionality. The query receptor and response generator may also perform functions such as data formatting or requesting additional information from the query source, depending on the particular embodiment.

The pattern matcher may or may not need to reference a stored list of known patterns in order to find the identifier pattern which is generated by the virtual resource identified in a query. For example, in embodiments in which a list is not stored, the pattern matcher may be operable to derive the unique identifier pattern based on the identification of the virtual resource in the query. That is to say, it may be possible to know the identifier pattern a virtual resource generates based only on the identity of the virtual resource and a fixed calculation or routine which is true for all virtual resources in the domain. Advantageously, such embodiments can obviate the need for a list to be maintained. Furthermore, a risk of two virtual resources having the same pattern can be avoided by linking the pattern directly to the unique ID, for example, a bit-wise representation of a unique ID number. Preferably, identifier patterns are unique within the domain or environment.

In embodiments in which the identifier patterns can not be found by the direct derivation from a unique ID as described above, and the pattern generated by a virtual resource which a user or service seeks to discover is not stored on a list, an alternative derivation method exists. This alternative method uses the sensor data receptor and pattern extractor to learn the identifier pattern generated by a virtual resource. However, as a prerequisite, a physical resource employed in providing the virtual resource must be known during the initial learning period. In such embodiments, as well as identifying a virtual resource, the query also identifies a physical resource currently employed in providing the identified virtual resource, the sensor data receptor is operable to gather sensor data from the identified physical resource over a prescribed time period during which it is known that the identified physical resource remains employed in providing the identified virtual resource, and the pattern extractor is operable to extract a pattern from the gathered sensor data as the identifier pattern known to be generated by the identified virtual resource.

Advantageously, such an embodiment could be used when a service provider knows in advance that it will want to know the physical resources employed in providing a particular virtual resource over a forthcoming period of, say, a few weeks. For example, a service provider may know that a particularly busy period is approaching, and may need to monitor the condition of physical resources providing the service closely over this period.

Embodiments of the present invention are not limited in terms of from how many environment sensors sensor data for a physical resource is received. It may be that data from more than one environment sensor each sensing changes in different operating properties of a physical resource is received by the sensor data receptor.

Advantageously, such embodiments could be configured to generate, extract, store, and match multi-dimensional identifier patterns. This could increase the number of unique patterns available, and could also allow for greater distinction between patterns in a network domain. Alternatively, it may be that the changes in the operating properties are closely linked, for example each increases as load on the resource increases. In such configurations, one stream of sensor data could be used as a check for another stream.

In embodiments of another aspect of the present invention, a network controller is provided having detector apparatus embodying the present invention. Advantageously, providing the detector apparatus as part of the network controller allows the detector apparatus to be included in a device with other computing environment management tools and services which may require the functionality of the detector apparatus.

In embodiments of another aspect of the present invention, a computer program is provided which, when executed by a computing apparatus, causes the computing apparatus to function as a detector apparatus embodying the present invention, or as a network controller embodying the present invention.

In embodiments of another aspect of the present invention, a computer network is provided including a plurality of physical resources each being operable to be employed in providing the virtual resources, and each having an environment sensor operable to output sensor data representing changes in an operating property of the physical resource, and a detector apparatus embodying the present invention or a network controller embodying the present invention.

There are embodiments of the present invention in which the nature of the virtual resources is such that an identifiable pattern is generated in the operating properties of physical resources employed in their provision. However, in alternative embodiments, the virtual resources provided in the computer network are each operable to run a probe module, the probe module being operable to artificially generate an identifier pattern in the sensor data of a physical resource employed in providing the respective virtual resource. Preferably, each probe module running in an environment or domain is operable to generate a different identifier pattern.

The pattern is referred to as artificially generated because the probe is operable to cause changes in the operating property being sensed by the environment sensor regardless of the requirements of the virtual resource in providing the service for which it is intended. The probe module may be considered to generate an identifier pattern in the sensor data of a physical resource employed in providing the respective virtual resource. For example, the pattern may be generated by causing a change in the operating property of the physical resource.

Advantageously, the running of a probe module substantially ensures that the pattern will be present in the sensor data, regardless of other operating demands. Furthermore, probe modules provide a network operator or service provider with more control over the patterns that are generated. This may be particularly advantageous in a case where it is found that two virtual resources generate similar patterns, as one probe module could be reconfigured to generate a more distinct pattern.

The pattern may be generated on demand, for example, a 'generate pattern' message may be broadcast over the network by the network controller or detector apparatus. Alternatively, the pattern is periodic, and will be generated at prescribed intervals. The frequency of the intervals will depend on the demands of the particular computing environment in which the invention is embodied. For example, if discovery is a very big problem, and the detector apparatus is in high demand and requires fast extraction and matching of patterns, it may be that the probes are configured to produce the patterns continuously. However, probes may operate by, for example, generating load on a processor of a physical resource which produces a change in the operating property of drawn current, as sensed by the environment sensor. Therefore, if discovery of resources is more of an intermittent need, the probes may be configured to generate patterns less frequently. This will reduce power consumption, but will increase time taken for extraction of patterns from sensor data.

In a simple embodiment, the identifier pattern generated by the probe is a binary sequence representing a unique identifier of the respective virtual resource. Advantageously, the detector apparatus can then derive the identity of the virtual resource directly from the pattern without requiring any prior knowledge of the pattern generated by the virtual resource.

In embodiments of an alternative aspect of the present invention, there is provided a probe module for running on a virtual resource in a computer network, the computer network including a plurality of physical resources each being operable to be employed in providing virtual resources and having an environment sensor outputting sensor data representing changes in an operating property of the physical resource, and a detector apparatus, wherein the detector apparatus is operable to detect a physical resource employed in providing a particular virtual resource in the computing environment, and comprises a sensor data receptor operable to receive sensor data output by the environment sensors, a pattern extractor operable to extract a pattern from the received sensor data from a physical resource, and a pattern matcher, wherein the pattern matcher is operable to compare the extracted pattern with an identifier pattern known to be generated by a particular virtual resource, and to detect that the physical resource is employed in providing the particular virtual resource when a match is found, the probe module being operable to artificially generate an identifier pattern in the sensor data of a physical resource employed in providing the respective virtual resource.

In embodiments of another alternative aspect there is provided a method for detecting a physical resource employed in providing a particular virtual resource in a computer network in which physical resources are operable to provide virtual resources, the computer network including a plurality of physical resources each being operable to be employed in providing virtual resources and having an environment sensor outputting sensor data representing changes in an operating property of the physical resource. The method comprises: at a sensor data receptor, receiving sensor data output by the environment sensors; at a pattern extractor, extracting a pattern from the received sensor data from a physical resource, comparing the extracted pattern with an identifier pattern known to be generated by a particular virtual resource; and at a pattern matcher, detecting that the physical resource is employed in providing the particular virtual resource when a match is found.

In embodiments of another aspect of the present invention, there is provided a method of identifying a virtual resource in a computer network in which physical resources are operable to provide virtual resources, the computer network including a plurality of physical resources each being operable to be employed in providing virtual resources and having an environment sensor outputting sensor data representing changes in an operating property of the physical resource, and a detector apparatus, wherein the detector apparatus is operable to detect a physical resource employed in providing a particular virtual resource in the computing environment, and comprises a sensor data receptor operable to receive sensor data output by the environment sensors, a pattern extractor operable to extract a pattern from the received sensor data from a physical resource, and a pattern matcher, wherein the pattern matcher is operable to compare the extracted pattern with an identifier pattern known to be generated by a particular virtual resource, and to detect that the physical resource is employed in providing the particular virtual resource when a match is found. The method comprises artificially generating an identifier pattern in the sensor data of a physical resource employed in providing the respective virtual resource.

BRIEF DESCRIPTION OF THE DRAWINGS

Preferred features of the present invention will now be described, purely by way of example, with reference to the accompanying drawings, in which:—

DETAILED DESCRIPTION OF THE PREFERRED EMBODIMENTS

Figure 1:
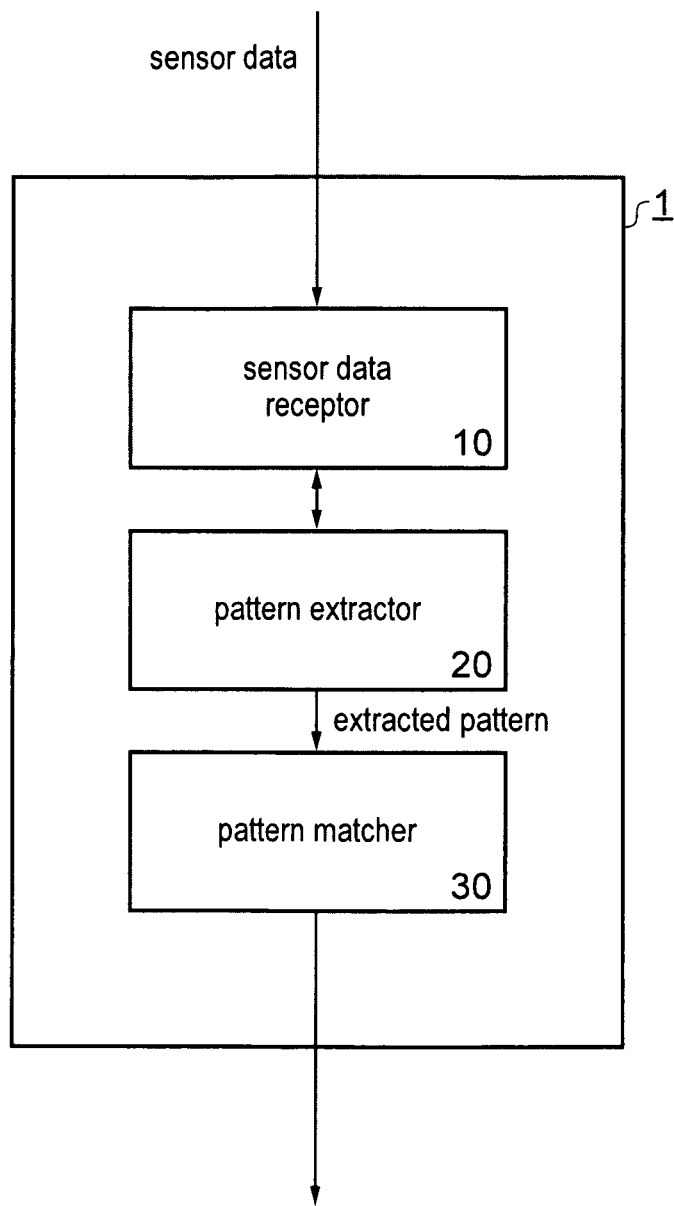
FIG. 1 is a schematic representation of a detector apparatus of an invention embodiment.

The detector apparatus 1 comprises a sensor data receptor 10, a pattern extractor 20, and a pattern matcher 30.

The detector apparatus 1, and each of the components thereof in this embodiment and each embodiment described hereinafter, may be realised as dedicated hardware components, or may be realised as functional modules running on a computing apparatus. In the latter case, the functional modules may be a combination of executable software code, input and output interfaces, a processor, and a storage device. Each component may be executed on a common computing device, or the detector apparatus 1 may be realised by cooperative operation of more than one computing device. Such computing devices should at least have an interconnected network interface device, storage device, and processor, and may also have input devices and a display unit. The computing device providing the detector apparatus functionality may be dedicated to that function, or may be a network controller operable to perform other tasks, for example, network management functions such as task distribution.

The sensor data receptor 10 is connected to an environment sensor or some interface from which sensor data is received. The pattern extractor 20 is operable to analyse sensor data received by the sensor data receptor 10 and extract patterns therefrom. Sensor data may be stored by the sensor data receptor 10 or elsewhere, and the pattern extractor 20 can then access the stored data in order to extract patterns. Alternatively, there may be a data connection between the sensor data receptor 10 and the pattern extractor 20 so that the sensor data can be passed to the pattern extractor 20 for analysis and pattern extraction. The sensor data receptor 10 may perform some initial formatting of the received sensor data. The pattern extractor is then operable to pass data representing the extracted pattern to the pattern matcher 30. There is therefore a data connection between the pattern matcher and the data extractor. The pattern matcher 30 is operable to output detection data when a match is found.

The sensor data receptor 10 receives sensor data. The sensor data represents changes in an operating property of a physical resource detected by an environment sensor. The environment sensor may, for example, sense changes in the current drawn by a physical resource or component thereof, such as the processor. The sensor data therefore reflects power drawn by the physical resource. The sensor data may provide absolute values of the operating property, but must at least be sufficient for changes in the operating property to be represented.

On reception of sensor data, the sensor data receptor 10 may perform some parsing, codifying, scaling, or other formatting of the received data. The sensor data receptor 10 may comprise one or more received data buffers for separating and temporarily storing data from multiple environment sensors. The sensor data is treated in a way in which the environment sensor from which it is received, or the physical resource whose operating property it senses, is recognisable. For example, the sensor data may be stored in packets or as files with a header detailing the relevant environment sensor or physical resource. Alternatively, the pattern detector 1 may deal with environment sensors consecutively so that at any one time it is receiving data from one environment sensor or physical resource only.

Pattern detection algorithms are widely available and in use in wide-ranging fields of technology. The skilled person will appreciate that selection of particular algorithms or routines will depend on the particular requirements of the invention embodiment. However, in a simple embodiment, continuing the example mentioned above in which the sensor data represents changes in drawn current, a threshold could be set, and at instances in a time period for which sensor data is received, separated by a prescribed interval, current values above the threshold be marked '1' and below the threshold marked '0'. In this way, a bit sequence can be extracted from which the pattern extractor 20 can, for example, seek recurring patterns.

Depending on the embodiment, it may be that patterns are in a particular format so that the pattern extractor 20 can seek and extract patterns fitting that format. Alternatively, discrimination between pattern formats can be left to the pattern matcher 30, since patterns in the incorrect format will not produce a match.

The pattern matcher 30, having a known identifier pattern belonging to a particular virtual resource for which details of the physical resources employed in its provision are required, can then compare the known pattern with extracted patterns supplied by the pattern extractor 20. The extent to which patterns need to be the same to be considered a match by the pattern matcher 30 will depend on the embodiment. For example, it may that two identical bit patterns of a predetermined length are required. Alternatively, the pattern matcher may be operable to assess the likelihood of an extracted pattern being from the particular virtual resource based on the known pattern. There may then be a threshold likelihood configured to produce a match.

The detector apparatus 1 may compare the known pattern with a pattern or patterns from each environment sensor or physical resource in the domain looking for matches. It may be that more than one physical resource is employed in providing a particular virtual resource, in which case more than one match may be found. Data processing requirements of the detector apparatus 1 may be such that the detector apparatus 1 is operable to run a multi-threaded operation with many streams of sensor data undergoing pattern extraction and matching concurrently.

A virtual resource in the context of the embodiments described herein may be, for example, an interface to the infrastructure layer of a system architecture, in which the virtual resource provides the higher layer access to physical resources providing the infrastructure layer, as though the virtual resource is itself a physical resource providing the infrastructure layer.

Figure 2:
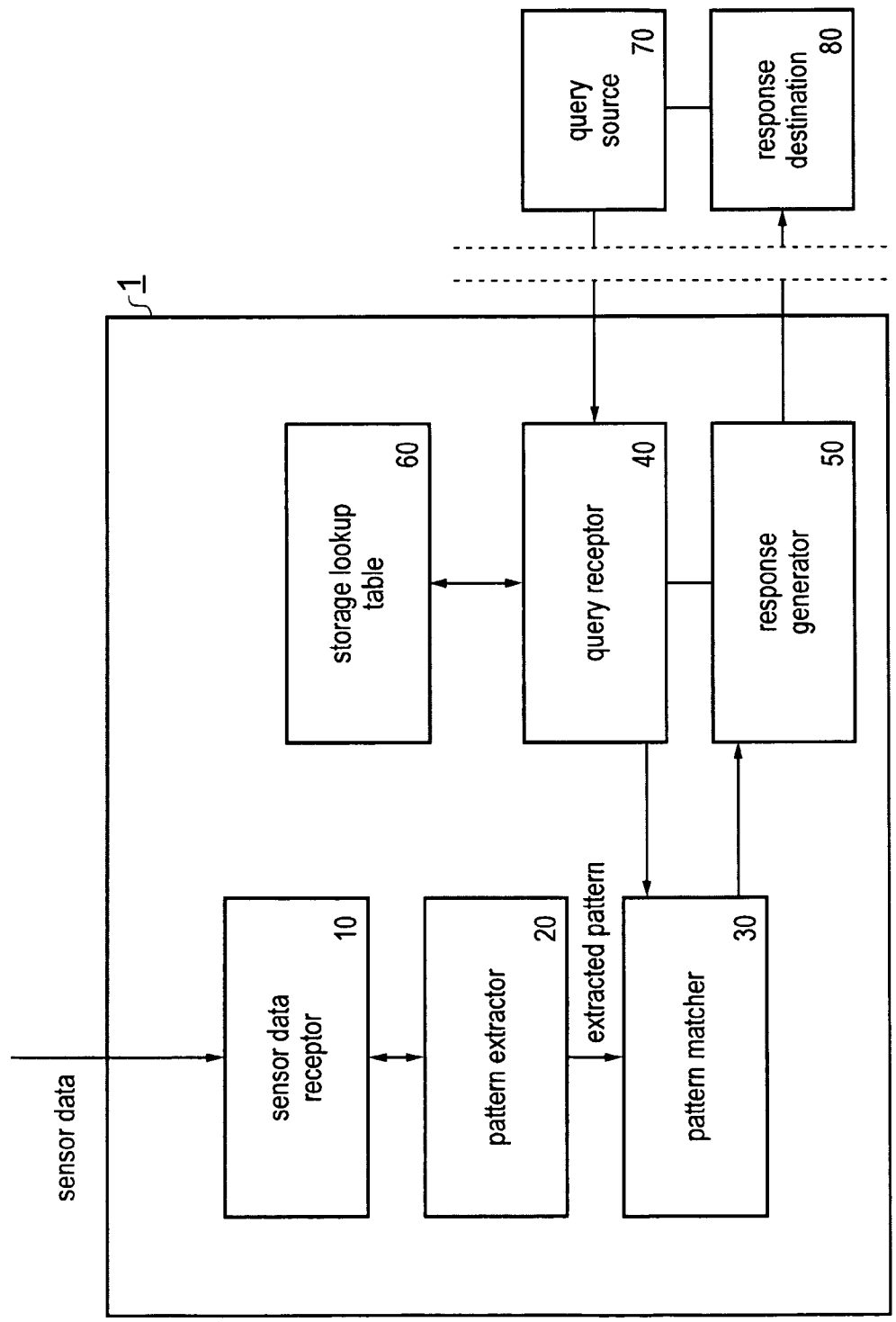
FIG. 2 is a schematic representation of a detector apparatus of another invention embodiment.

FIG. 2 is a schematic diagram of an embodiment which is operable to receive and respond to queries. The detector apparatus 1 has a sensor data receptor 10, pattern extractor 20, and pattern matcher 30, and these components are as described above in relation to FIG. 1. The detector apparatus 1 further comprises a query receptor 40, a response generator 50, and a storage lookup table 60. A query source 70 and response destination 80 are also illustrated, though these are not considered features of the embodiment.

Data connections between components are not restricted to those shown in the embodiment. Certain connections have been selected for illustration, though it is to be understood that other connections between components may exist. The query receptor 40 is connected to the pattern matcher 30 to allow data representing a pattern known to be generated by the virtual resource identified in the query to be passed to the pattern matcher. The pattern matcher 30 is connected to the response generator 50 so that details of the physical resource from which the extracted pattern found to match the known pattern originated can be passed to the response generator 50 and formatted into a response. The query receptor 40 is connected to the response generator 50 for interchange of information relating to the query or otherwise. The query receptor 40 is connected to a storage lookup table 60 in embodiments in which, having received a query identifying a particular virtual resource, the query receptor 40 refers to a stored list (storage lookup table) 60 for the pattern known to be generated by that virtual resource.

The query source 70 may be a user or service such as a troubleshooter program. The dashed lines between the query source 70, response destination 80, and the detector apparatus 1 represent the possible presence of other components of a computing environment. The query source 70 passes a query to the query receptor 40. From the query content, the query receptor 40 can identify at least a particular virtual resource for which the query source would like details of the physical resources employed in its provision.

The query receptor 40 may also be able to derive the pattern known to be generated by that particular virtual resource from the query content or from the identity of the identified virtual resource. Alternatively, the query receptor 40 may revert to the storage lookup table 60 for the identifier pattern that the identified virtual resource is known to generate.

The query receptor 40 then passes the identifier pattern to the pattern matcher as the known pattern for which the pattern matcher will seek a match from extracted patterns. For example, the sensor data receptor 10, pattern extractor 20, and pattern matcher 30 may collectively analyse sensor data from each environment sensor or physical resource in the domain to find a match or matches. Once a match is found, the pattern matcher 30 can pass details of the environment sensor or physical resource from which the matching data originated to the response generator 50. The response generator 50 may need to consult a database or lookup table for further information relating to the origin of the matched data. The response generator 50 can then generate a response to the query, possibly using information form the query receptor 40, such as a destination for the response. The response generator 50 can then pass the response to the response destination 80. The response destination may or may not be the same as the query source 70.

Figure 3:
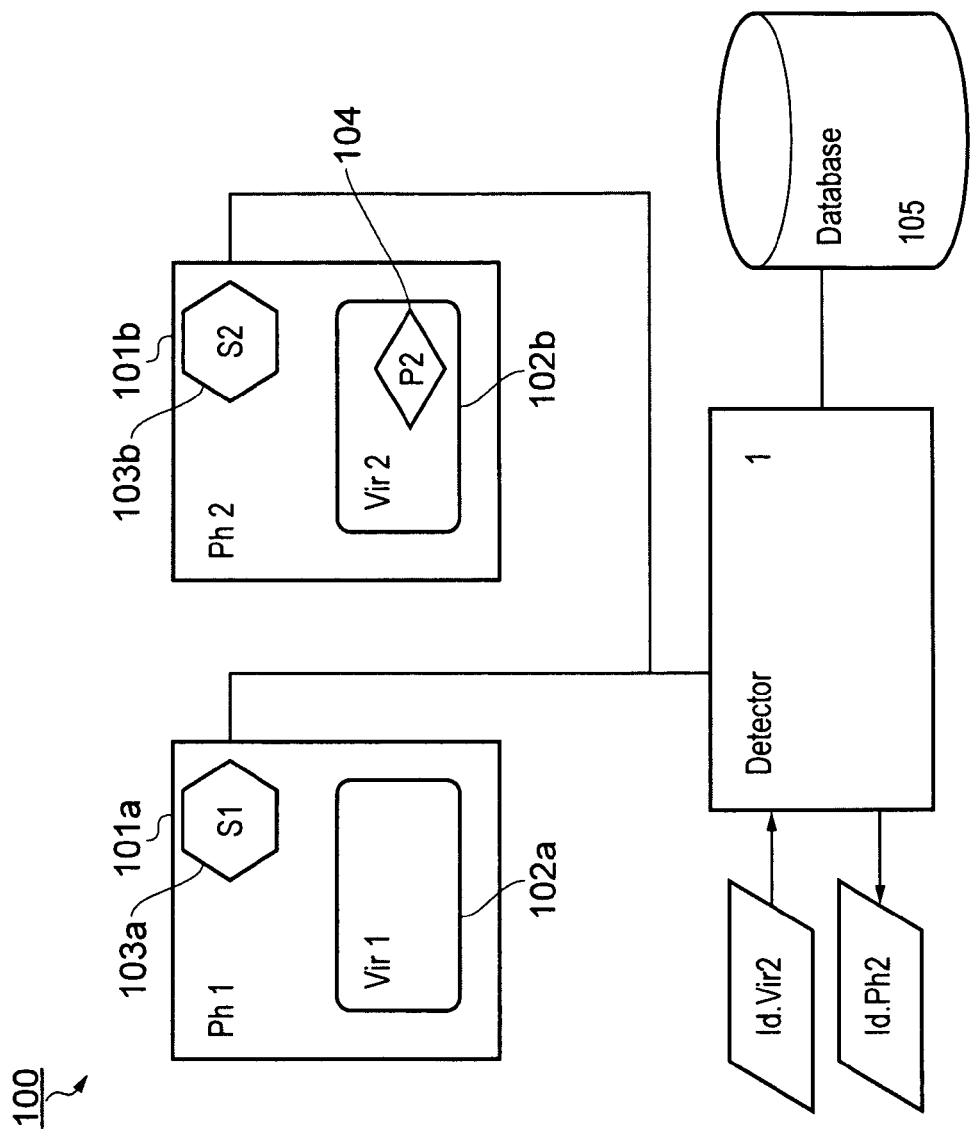
FIG. 3 is a schematic diagram of a detector apparatus of another invention embodiment.

FIG. 3 is a schematic diagram of a computing network embodying the present invention.

The network 100 includes physical resources, 101a, with the identifier 'Ph 1', and 101b, with the identifier 'Ph 2'. Physical resource 101a has an environment sensor 103a, and is employed in providing a virtual resource 102a, the virtual resource 102a having the identifier 'Vir 1'. Physical resource 101b has an environment sensor 103b, and is employed in providing a virtual resource 102b, the virtual resource 102b having the identifier 'Vir 2'. The virtual resource 102b is running probe software 104. The identifiers 'Ph 1', 'Ph 2', 'Vir 1' and 'Mr 2' are arbitrary, but should be unique within the domain.

The network also includes a detector apparatus 1 and a database 105. The detector apparatus 1 may be the detector apparatus as described above with reference to FIG. 1 and/or FIG. 2.

The physical resources 101a and 101b are connected to one another and to the detector.

The physical resources 101a and 101b may be network components such as server machines or other computers. Alternatively, the physical resource may be a network switch or other managed network component.

The detector apparatus 1 first receives a query with the identifier of a virtual resource of interest, in this case the message is 'Id Vir2', which is sufficient for the detector apparatus 1 to recognise that details of the physical resources employed in providing the virtual resource 102b having the identifier 'Vir 2' are required.

The detector apparatus 1 then scans the output from environment sensors in the domain, 103a and 103b, using the data receptor 10 and pattern extractor 20. The output from the environment sensors 103a and 103b is scanned over a period of time, the length of that period being determined by the nature of the virtual resource or other configurable factors.

Figure 4:
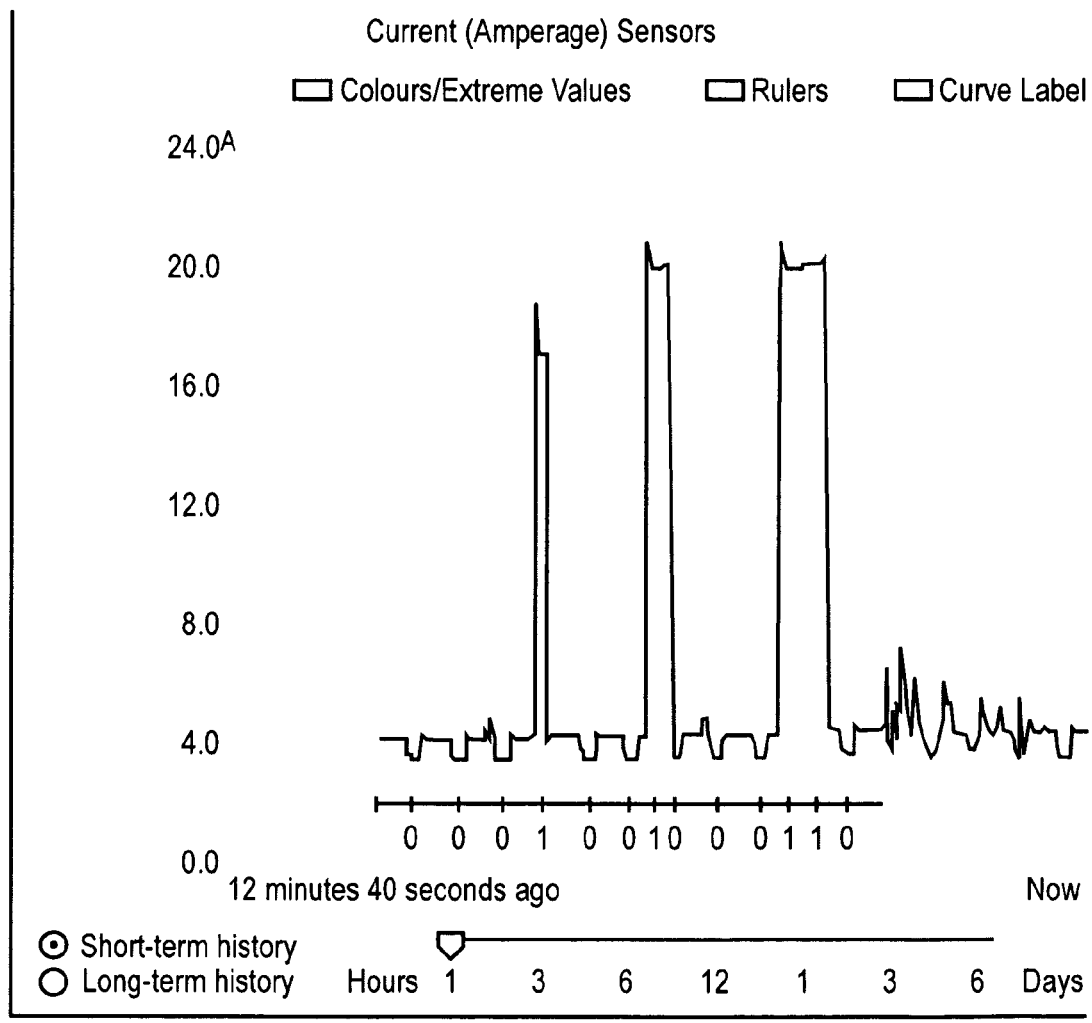
FIG. 4 is a representation of sensor data received by a sensor data receptor in an embodiment of the present invention.

FIG. 4 represents a typical graph of sensor data that may be gathered over the period of time for which the environment sensors are scanned. The conversion of the graph data into bit code may be performed by the sensor data receptor 10 or the pattern extractor 20. The extracted pattern of FIG. 4 may be naturally arising due to the work performed by the physical resource in running the virtual resource and performing other work, or it may be created artificially by software running on a virtual resource. The extracted pattern of FIG. 4 is from the environment sensor 103b of physical resource 101b on which virtual resource 102b is being run. Virtual resource 102b is running probe software 104, which is responsible for artificially creating the pattern in FIG. 4.

In fact, the environment sensor S2 is sensing the current drawn by the CPU of physical resource 101b. The probe software P2 is operable to place load on the CPU at predetermined times to form a 'load pattern'. Increases in load can be caused, for example, by requiring that the CPU perform complex calculation-intensive simulations, with the only requirement being that the simulations can be stopped and started according to the load pattern required by the probe software to create the artificial pattern in the output sensor data.

The pattern created by the probe software P2 is specific to the virtual resource 102b on which it is run. Depending on the particular embodiment, it may be that the pattern created by the probe software P2 is specific to the identifier of the virtual resource on which it is run (a virtual resource may end or expire and its identifier be re-used for a new virtual resource). In the extracted pattern in FIG. 4, created by the probe software 104, the pattern is encoded in binary by a series of high and low current operations on the CPU of the physical resource 101b. These variations in load are reflected in the current drawn by the CPU and sensed by the environment sensor 103b. The sensor data from the environment sensor 103b is passed to the sensor data receptor 10 of the detector apparatus 1 over the network.

In the particular embodiment of FIG. 3, the extracted pattern is compared with a list of identifier patterns known to be generated by particular virtual resources or to be associated with particular virtual resource IDs on an external database 105, though such a list may be stored within the detector apparatus 1. If the extracted pattern is associated with the particular virtual resource ID matching that of the query, 'Vir 2' in this case, then the detector apparatus 1 can output the identifier of the physical resource 101b from which the pattern was sensed.

In the embodiment illustrated in FIGS. 4 and 5, the extraction and matching processes are fairly simple by virtue of the binary nature of the pattern: high current='1'; low current='0'. There may be more complicated embodiments, such as those with multi-dimensional patterns generated by more than one environment sensor operating on a particular physical resource. Alternatively, the virtual resource may be performing multiple activities so that a noise filter is needed to extract the pattern from the noise created by other activities on the virtual resource.

A single physical resource may be employed in providing more than one virtual resource, in which case further filtering of the received sensor data may be required to extract a pattern.

The known patterns may be analogue variations in the value they are detecting. This may provide more degrees of freedom in the patterns which could reduce the time taken for a full period of a pattern to be performed, and reduce the variation in high/low points required.

In any of the above aspects, the various features may be implemented in hardware, or as software modules running on one or more processors. Features of one aspect may be applied to any of the other aspects.

The invention also provides a computer program or a computer program product for carrying out any of the methods described herein, and a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

The invention claimed is:

1. A computing device configured in a computing environment including a plurality of physical resources configured to be employed in providing virtual resources and having an environment sensor outputting sensor data representing changes in an operating property relating to power drawn by a component of a physical resource among the plurality of physical resources, comprising:
a processor, coupled to the computing device;
the computing device including:
a sensor data receptor and a memory configured to receive and store the sensor data output by the environment sensor representing the changes in the operating property relating to the power drawn by the component of the physical resource among the plurality of physical resources;
a pattern extractor configured to extract a pattern from the received sensor data from the physical resource among the plurality of physical resources, the pattern representing the changes in the operating property relating to power drawn by the component of the physical resource;
a memory storing a list of virtual resources provided by the plurality of physical resources and, for each of the listed virtual resources, an identifier pattern that a listed virtual resource is known to artificially generate in the output sensor data of the physical resource, from among the plurality of physical resources, employed in providing the listed virtual resource; and
a pattern matcher configured to compare the extracted pattern with the identifier pattern known to be generated by a virtual resource among the virtual resources, and to identify the physical resource among the plurality of physical resources as providing the virtual resource when a match is found.

2. The computing device according to claim 1, further comprising:
a query receptor configured to receive a query identifying the virtual resource and requesting detection of the physical resource employed in providing that virtual resource; and
a response generator configured, when the match is found by the pattern matcher using the virtual resource identified in the query as the virtual resource, to generate and output a response identifying that the physical resource as being employed in providing the virtual resource identified in the query.

3. The computing device according to claim 2, wherein the pattern matcher is configured to derive the unique-pattern based on the identification of the virtual resource in the query.

4. The computing device according to claim 3, wherein the query identifies the physical resource currently employed in providing the identified virtual resource;
the sensor data receptor is configured to gather sensor data from the identified physical resource over a prescribed time period during which the identified physical resource remains employed in providing the identified virtual resource; and
the pattern extractor is configured to extract a pattern from the gathered sensor data as the identifier pattern known to be generated by the identified virtual resource.

5. The computing device according to claim 1, wherein the sensor data receptor is configured to receive sensor data from a physical resource among the plurality of physical resources having more than one environment sensor each outputting sensor data representing changes in a different operating property.

6. The computing device according to claim 1, wherein the computing device is a network controller for the computing environment.

7. A computer network, comprising:
a computing device configured in a computing environment including a plurality of physical resources configured to be employed in providing virtual resources and having an environment sensor outputting sensor data representing changes in an operating property relating to power drawn by a component of a physical resource among the plurality of physical resources, comprising:
a processor, coupled to the computing device;
the computing device including:
a sensor data receptor and a memory configured to receive and store the sensor data output by the environment sensor representing the changes in the operating property relating to the power drawn by the component of the physical resource among the plurality of physical resources;
a pattern extractor configured to extract a pattern from the received sensor data from the physical resource among the plurality of physical resources, the pattern representing the changes in the operating property relating to power drawn by the component of the physical resource;
a memory storing a list of virtual resources provided by the plurality of physical resources and, for each of the listed virtual resources, an identifier pattern that a listed virtual resource is known to artificially generate in the output sensor data of the physical resource, from among the plurality of physical resources, employed in providing the listed virtual resource; and
a pattern matcher configured to compare the extracted pattern with the identifier pattern known to be generated by a virtual resource among the virtual resources, and to identify the physical resource among the plurality of physical resources as providing the virtual resource when a match is found.

8. The computer network according to claim 7, in which:
the virtual resources provided in the computer network are each configured to run a probe module, the probe module being configured to artificially generate an identifier pattern in the sensor data of a physical resource employed in providing the respective virtual resource.

9. The computer network according to claim 8, wherein the pattern is periodic.

10. The computer network according to claim 8, wherein the probe module is configured to artificially generate the identifier pattern in the sensor data of a physical resource by causing a change in the property relating to power drawn by the component of the physical resource.

11. The computer network according to claim 7, wherein the identifier pattern is a binary sequence representing a unique identifier of the respective virtual resource.

12. The computer network according to claim 7, wherein the physical resources are computing devices.

13. A method for detecting a physical resource employed in providing a virtual resource in a computer network in which physical resources are configured to provide virtual resources, the computer network including a plurality of physical resources configured to be employed in providing virtual resources and having an environment sensor outputting sensor data representing changes in an operating property of a physical resource among the plurality of physical resources, the method comprising:
receiving the sensor data output by the environment sensor;
extracting a pattern from the received sensor data from the physical resource among the plurality of physical resources, the pattern representing the changes in the operating property relating to power drawn by the component of the physical resource;
storing a list of virtual resources provided by the plurality of physical resources and, for each of the listed virtual resources, an identifier pattern that a listed virtual resource is known to artificially generate in the output sensor data of the physical resource, from among the plurality of physical resources, employed in providing the listed virtual resource; and
comparing the extracted pattern with the identifier pattern known to be generated by a virtual resource among the virtual resources, and identify the physical resource among the plurality of physical resources as providing the virtual resource when a match is found.

14. A non-transitory storage medium storing a computer program which, when executed by a computing apparatus in a computer network in which a plurality of physical resources are configured to provide virtual resources, causes the computing apparatus to perform a method for detecting a physical resource employed in providing a virtual resource, the plurality of physical resources being configured to be employed in providing virtual resources and having an environment sensor outputting sensor data representing changes in an operating property of a physical resource among the plurality of physical resources, the method comprising:
receiving the sensor data output by the environment sensor;
extracting a pattern from the received sensor data from the physical resource among the plurality of physical resources, the pattern representing the changes in the operating property relating to power drawn by the component of the physical resource;
storing a list of virtual resources provided by the plurality of physical resources and, for each of the listed virtual resources, an identifier pattern that a listed virtual resource is known to artificially generate in the output sensor data of the physical resource, from among the plurality of physical resources, employed in providing the listed virtual resource; and
comparing the extracted pattern with the identifier pattern known to be generated by a virtual resource among the virtual resources, and identifying the physical resource among the plurality of physical resources as providing the virtual resource when a match is found.

15. The method according to claim 13, the method further comprising:
artificially generating an identifier pattern in the sensor data of a physical resource employed in providing the respective virtual resource.

* * * * *